United States Patent

[11] 3,594,755

| [72] | Inventor | Hermanus Stephanus Josephus Pijls<br>Emmasingel, Eindhoven, Netherlands |
|---|---|---|
| [21] | Appl. No. | 762,058 |
| [22] | Filed | Sept. 24, 1968 |
| [45] | Patented | July 20, 1971 |
| [73] | Assignee | U.S. Philips Corporation<br>New York, N.Y. |
| [32] | Priority | Sept. 25, 1967 |
| [33] | | Netherlands |
| [31] | | 6713062 |

[54] YARN SPEED MEASUREMENT ON THE BASIS OF YARN NOISE
16 Claims, 9 Drawing Figs.

[52] U.S. Cl. .................................................. 340/259,
307/233, 250/219 DF
[51] Int. Cl. ........................................... G08b 23/00,
G08c 19/36
[50] Field of Search ......................................... 340/259

[56] References Cited
UNITED STATES PATENTS

| 2,524,579 | 10/1950 | Taylor | 340/259 |
| 2,978,636 | 4/1961 | Fountain | 340/259 |
| 3,363,458 | 1/1968 | Scharf | 340/259 |

*Primary Examiner*—Thomas B. Habecker
*Attorney*—Frank R. Trifari

ABSTRACT: A yarn testing device having means for measuring the yarn speed. The device includes a pickup member for deriving a yarn signal from the passing yarn. The yarn signal includes a noise signal component produced by normal irregularities of the yarn, the amplitude and frequency thereof being proportional to yarn speed. A high pass network passes only the noise signal to an amplitude or frequency detector in which it is compared with a reference voltage indicative of a reference yarn speed to derive a signal proportional to yarn speed.

INVENTOR.
HERMANUS S.J. PIJLS

BY

AGENT

INVENTOR.
HERMANUS S.J.PIJLS

YARN SPEED MEASUREMENT ON THE BASIS OF YARN NOISE

This invention relates to a device for measuring yarn speeds comprising a pickup member in which an electrical signal with a noise component produced by the natural irregularities of the yarn is obtained from the passing yarn.

Such a device suitable for use in a yarn cleaner is known. The pickup may be an optical, electrical or capacitative member through which the yarn is passed. The yarn has natural irregularities such as projecting fibers and the like, which produce the so-called yarn noise component of the electrical signal produced in the pickup. Apart therefrom the yarn exhibits less desirable or undesirable irregularities in the diameter, so-called slubs, double-threads and the like, which produce a variable diameter component in the yarn signal. The latter component is employed in the known devices of the kind set forth for measuring the variable diameter of the yarn or for eliminating the respective irregularity from the yarn, when a given permissible diameter is exceeded (so-called yarn cleaner).

The yarn noise appears not only at the parts of the yarn having a diameter lying within the permissible limits but also at the parts of the yarn having a diameter lying beyond the permissible limits.

It is known to use this yarn noise component, which is averaged over the length of the traversed pickup, as an indication of the passage of yarn, if any, across the pickup. If a noise component appears, this is indicative of a passing yarn. If no noise component appears it means that the yarn is standing still. This indication of the yarn travel is used to control a yarn travel switch when a yarn is inserted into the pickup. The invention has for its object to provide further advantageous possibilities of use of said yarn noise component.

The device for measuring yarn speeds, comprising a pickup in which an electrical signal having a yarn noise component produced by the natural irregularities of the yarn is obtained from a passing yarn, is characterized, in accordance with the invention, in that a network passing the higher frequencies of the yarn signal is provided to which the yarn signal is applied and from the output of which a yarn noise signal having an amplitude and a frequency proportional to the yarn speed is derived. Known means are provided for detecting the amplitude or the frequency of said yarn noise signal and for comparing it with a reference speed. The invention is based on the recognition of the fact that the amplitude and the frequency of the yarn noise signal obtained from the network passing the higher frequencies of the yarn signal are proportional to the yarn speed across the pickup. The frequency and/or the amplitude of the yarn noise signal are detected in a frequency or amplitude detector and by comparing it with a reference value, which may be adjustable, if necessary, with respect to the kind of yarn, it provides a signal which is a direct measure of the yarn speed. Said network passing the higher frequencies is preferably formed by a differentiating member in the case where the amplitude of the yarn noise signal is measured. The amplitude of the yarn noise signal is directly proportional to the speed of the yarn. In the case of frequency measurement, the network passing the higher frequencies of the yarn signal may be formed not only by a differentiator, but also by a high band-pass filter which cuts off the lower yarn signal frequencies produced by diameter variations. The highest yarn signal frequency, i.e. the highest yarn noise signal frequency, is the measure for the yarn speed.

The amplitude or frequency detection may be digital or analogue. The yarn speed can be easily converted into a yarn length measure, which is very useful in given applications. It is possible, for example, to apply the yarn noise signal, after passage through a device for forming counting pulses, to a counter which is started at the beginning of a yarn and stopped at the end of the yarn to be measured. Each pulse represents a length of the yarn so that the total number of counting pulses is proportional to the length of the yarn. Such a measurement of the yarn length by means of the amplitude of the yarn noise signal may also be obtained by using an integrator controlled by a start and stop signal.

A further very important possibility of using the yarn speed resides in measuring the lengths of the undesirable irregularities, for example, slubs of the yarn. Hitherto it has been common practice to apply the yarn signal with the yarn diameter component to one or more integrators having constantly or manually adjustable integration times. The integration times are determined by the minimum permissible kinds of irregularities (slubs and double yarns, for example). A slub having a small surface (small difference in diameter and short in the longitudinal direction of the yarn) has to produce a voltage across a capacitor in the integrator which should not exceed a threshold value. A slub having a large surface (great difference in diameter and short or long in the direction of the yarn or a small difference in diameter and long in the direction of the yarn) has to produce across the capacitor a voltage exceeding the threshold value for the yarn to be cleaned. This is, however, only possible when the yarn travels with a predetermined constant speed. If the yarn travels more slowly, a short irregularity takes a longer time so that erroneous detection may occur. If the yarn travels more rapidly, even a long irregularity will appear to be short so that the integrator will not attain the threshold value. By means of the yarn speed signal the device according to the invention permits of varying with time the time constant of the integrator or the integrators when various kinds of defects have to be detected in different channels. With a higher yarn speed the time of integration may be shorter and with a lower yarn speed the integration time may be prolonged by a simple control. In this way a solution may be found for all difficulties in cleaning yarns with different yarn speeds, especially in the start of the yarn after an interruption for cleaning or at the beginning or the end of a reel.

The invention will be described more fully with reference to the accompanying drawing in which.

Figure 1:
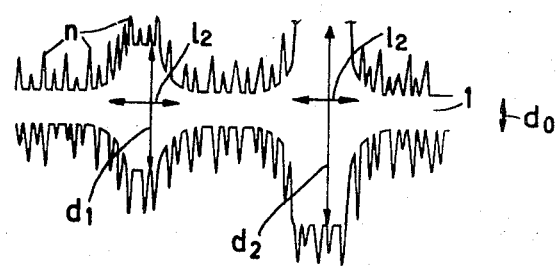
FIG. 1 shows a yarn with irregularities producing noise.

Referring to FIG. 1, reference numeral 1 designates a length of yarn. The normal diameter is $d_o$; the Figure shows two irregularities having a diameter $d_1$ and $d_2$ and lengths $l_1$ and $l_2$ respectively. Apart therefrom the yarn has the natural irregularities $n$ due to projecting fibers and the like, which produce the so-called yarn noise.

Figure 2:
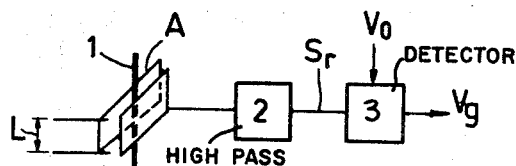
FIG. 2 is a circuit diagram of a device according to the invention.
Figure 3:
FIG. 3 shows a yarn noise signal $S_r$.

FIG. 2 shows diagrammatically a device according to the invention. Reference numeral 1 designates a yarn passing through a (for example, capacitative) pickup A, having a gap length L. The output of the pickup A is connected to a network 2 passing the higher frequencies of the yarn signal. This network is connected to a frequency or amplitude detector 3. By means of this network passing the higher frequencies of the yarn signal, the yarn noise signal component is derived from the yarn signal. FIG. 3 illustrates the waveform of the yarn noise signal $S_r$. In the case of frequency measurement of the yarn noise signal the network 2 passing the higher frequencies of the yarn signal may be a differentiator or a high band-pass filter.

The maximum repetition frequency of the yarn noise signal $S_r$ is a measure of the yarn speed $V_g$ and may be determined by means of a frequency detector 3. This may be a known digital frequency detector or an analogue frequency detector. The frequency detector is calibrated to a reference voltage speed $V_0$. When yarns of different kinds are tested, it may be necessary to adjust the reference speed per type of yarn (or number of types of yarn).

In the case of amplitude measurement of the yarn noise signal the network passing the higher frequencies of the yarn signal is preferably formed by a differentiator in order to obtain a linear relationship. The measuring device 3 is then formed as an amplitude detector, for example, a rectifier whose output voltage is related to a reference speed voltage $V_0$; the output signal is the speed signal $V_g$.

Figure 4:
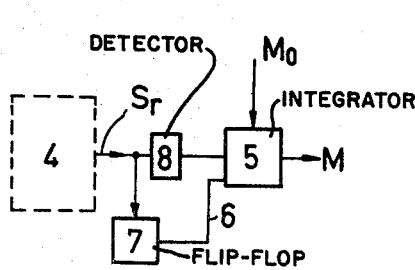
FIG. 4 is the circuit diagram of a yarn length measuring device.

FIG. 4 shows a device according to the invention for use in a yarn length measurement system. Reference numeral 4 designates a combination of the pickup device A and the network 2 of the preceding FIG. 2. The yarn noise signal $S_r$ is applied, in the case of speed measurement by amplitude, subsequent to amplitude detection in a detector 8, for example, a rectifier, to an integrator 5, which may be switched on and off under the control of a voltage at an input 6. The input 6 may be energized at the beginning of the yarn whose length M has to be measured, and at the end of the yarn length measured the input 6 is deenergized.

The voltage applied to the input 6 may be produced, for example, by the appearance or disappearance of the signal $S_r$, which controls a flip-flop 7, one output of which is connected to the input 6.

The voltage produced across the integrator 5 during the travel of the yarn (= yarn length) is, subsequent to calibration with a length signal $M_o$, a measure for the length M to be measured.

The integrator 5 may be formed in a digital system by a counting device controlled via the input 6, to which the signal $S_r$ is applied if necessary subsequent to amplification and to the formation of counting pulses in a pulse-shaper 8.

Figure 5:
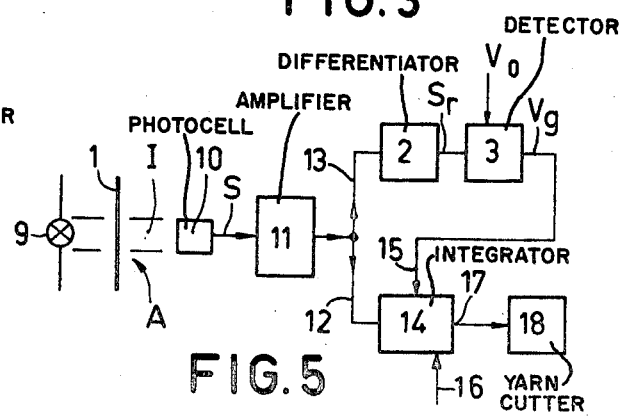
FIG. 5 is the circuit diagram of a device according to the invention employed in a yarn cleaner.

FIG. 5 shows a circuit diagram of a device according to the invention used in a yarn cleaner.

The pickup A, formed here by a photoelectric pickup comprising a lamp 9, a measuring channel I and a photoelectric cell 10, is connected to an amplifier 11, the output signal of which i.e. the amplified yarn signal S, is applied to conductors 12 and 13. The conductor 12 leads to an integrator 14 in which a capacitor is charged by the yarn signal and especially by the diameter component ($S_d$) thereof. The time constant of the integrator is automatically adjustable via an input 15. The integrator 14 furthermore has a threshold voltage or threshold current, which may be applied via an input 16. When the voltage across the integration capacitor has reached a given value, a voltage variation appears at the output 17 of the integrator energizing a known error counting and/or yarn cutting device 18.

The conductor 13 leads to a differentiator 2 and a frequency or amplitude detector 3 according to the invention, from whose output a speed signal $V_g$ is applied to the input 15 of said adjustable integrator 14.

Figure 6:
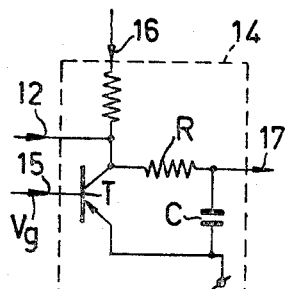
FIG. 6 shows an example of an adjustable integrator for use in a device as shown in FIG. 5.

The integration time constant of the integrator 14 is determined by the speed of the yarn so that a cleaning of the yarn is performed independently of the yarn speed: all less desirable or undesirable irregularities are tested with respect to their actual size. FIG. 6 shows an example of an automatically adjustable integrator 14. The transistor T, the resistor R and the capacitor C form the integration member. The integration time is variable by controlling the transistor T. For this purpose the input 15 through which the speed signal $V_g$ is applied is connected to the base of the transistor T. The yarn signal comes in via the conductor 12 and a threshold current is applied to the terminal 16. The supply of a threshold instead of a threshold voltage has the advantage that a positive and a negative difference current, i.e. the difference between the yarn current and the threshold current pass to the integrator. The integration capacitor is thus charged when the threshold current is exceeded and it is discharged when the threshold current is not exceeded. Only with an undesirable yarn difference the charge increases owing to a sufficiently high or long excess of the threshold current across the integration capacitor to a sufficient extent to produce a voltage variation at the output 17.

If a threshold voltage is used, the capacitor can only be charged by an excess of the threshold voltage. However, this excess cannot produce a discharge. The voltage across the capacitor therefore constantly increases also by permissible thickening of the yarn so that after some time an undesirable voltage variation may appear at the output 17 of the integrator. Special precautions are then required to avoid such an undesirable charge of the capacitor, which are not required by using the above mentioned threshold current.

Figure 7:
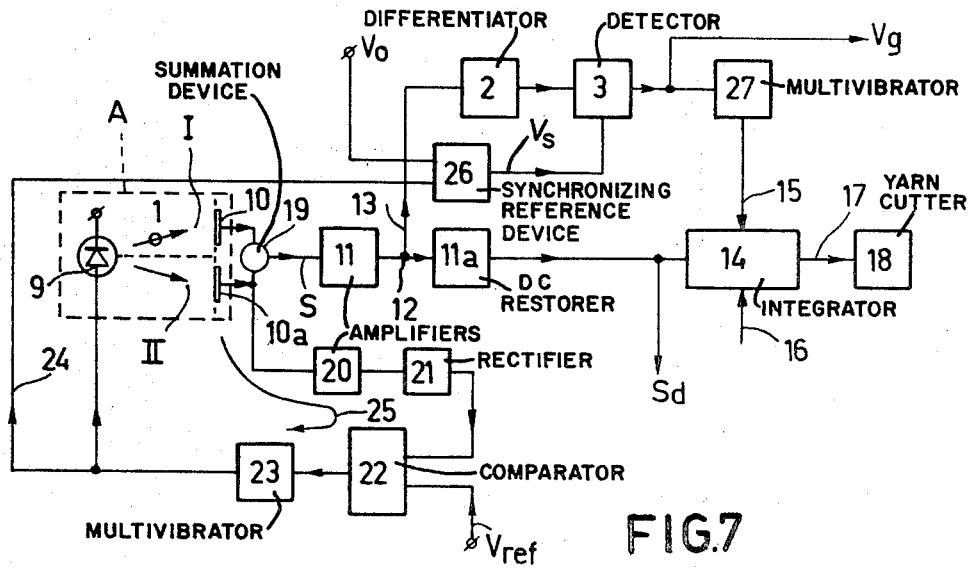
FIG. 7 shows an example of a further developed device as shown in FIG. 6.

FIG. 7 shows a detailed example of a device as shown in FIG. 5.

The pickup A may be a device comprising a point light source 9, for example, a gallium arsenide diode, a measuring channel I with a photoelectric cell 10 and a yarn 1 and a reference channel II having a photoelectric cell but 10a without any yarn, as described in the Dutch Patent Application Nr. .... filed at the same date (PHN. 2750). In this device the output of a summation device 19, to which are applied the signals from the measuring channel I and the reference signal of the channel II, provides a yarn signal which is measure of the absolute diameter of the yarn. The reference channel II serves for enabling an absolute measurement and is included in a control-loop 25, in which discrepancies of the pickup elements due to temperature variations and ageing are compensated. The device is preferably driven by an alternating voltage, for example, a square-wave voltage from a multivibrator 23, so that expensive and complicated direct-voltage amplifiers for amplifying the pickup signals are not required. Instead there may be employed alternating voltage amplifiers 11 and 10. The reference signal of the channel II is amplified in an amplifier 20 and rectified in a device 21. The rectified signal is compared in the device 22 with a fixed or a varying reference voltage $V_{ref}$ that varies with the yarn number (the average, nominal yarn thickness) and in the event of a difference the multivibrator 23 is readjusted so that in the loop 25, the voltage supply to the light source 9 is varied in a manner that will reduce the difference to zero.

The pickup A comprising the channels I and II serves to illustrate the possibility of producing in practice a yarn signal S with a yarn noise component $S_r$ and a yarn diameter component $S_d$ for speed detection in a modern arrangement.

The yarn signal S is amplified in the alternating-voltage-amplifier 11 and applied to the conductors 12 and 13.

Figure 8:
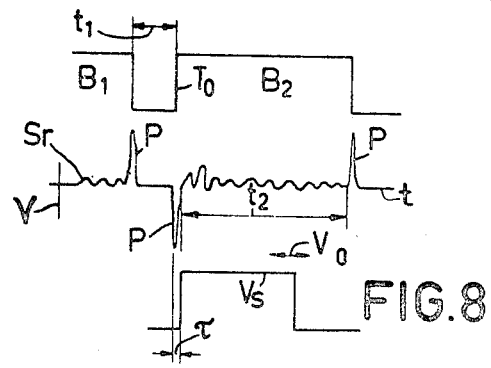
FIG. 8 illustrates some waveforms of signals.

In the device 11a the signal is adapted to a zero level (DC-restoring) and it is then an accurate measure ($S_d$) of the diameter of the yarn in the pickup. This diameter signal $S_d$ may be registered in a recording element (not shown). It is otherwise applied in said manner to the adjustable integrator 14. Reference numeral 16 designates the threshold current input and the output 17 is connected to the error counting and/or cutting device 18. The conductor 13 leads to a differentiator 2, followed by an amplitude detector 3, the output voltage $V_g$ of which represents the speed signal. The amplitude detector 3 is furthermore controlled by a signal $V_s$ from a reference adjusting device 26 synchronized with the supply pulses. This is required (see FIG. 8) because the yarn signal disappears between two supply pulses $B_1$ and $B_2$. The out-time $t_1$ of the source supplying the pickup is chosen to be so short that it does not affect the yarn diameter component of the pulsatory yarn signal; i.e. the out-time is so short that a length of yarn cannot pass completely through the measuring gap during the out-time. However, this out-time is harmful to the yarn noise component since the out-on and on-out transition of the supply pulses seriously disturb the yarn noise signal $S_r$ (peaks P, see FIG. 8). In order to obviate this disadvantage the control of the amplitude detector 3 by the device 26 ensures that the correct portion $t_2$ of the yarn noise signal $S_r$ is used and that the portion (P) produced by the pulsation of the supply source is not used. The device 26 furthermore receives a speed signal $V_0$ which determines the duration of the control-signal $V_s$ for the amplitude detector 3. It is thus determined what portion of the yarn noise signal appears at the output of the amplitude detector 3. In this way the speed signal $V_a$ at the output of the amplitude detector 3 is standardized. The reference speed signal $V_0$ may be adjusted in accordance with the kind of yarn since one kind of yarn has a different amplitude noise character than a further kind of yarn. It should be noted that frequency measuring of the yarn noise signal is carried out instead of amplitude measuring because, for all practical purposes the result does not depend upon the kind of yarn.

For controlling the integrator 14 in this example the speed signal $V_a$ is first converted in a multivibrator 27 into a pulsatory signal varying with the speed. This pulse signal, in which the on-out ratio is proportional to the yarn speed, controls the integrator with the same on and out rhythm in which the speed of charging of the integration capacitor is controlled.

Figure 9:
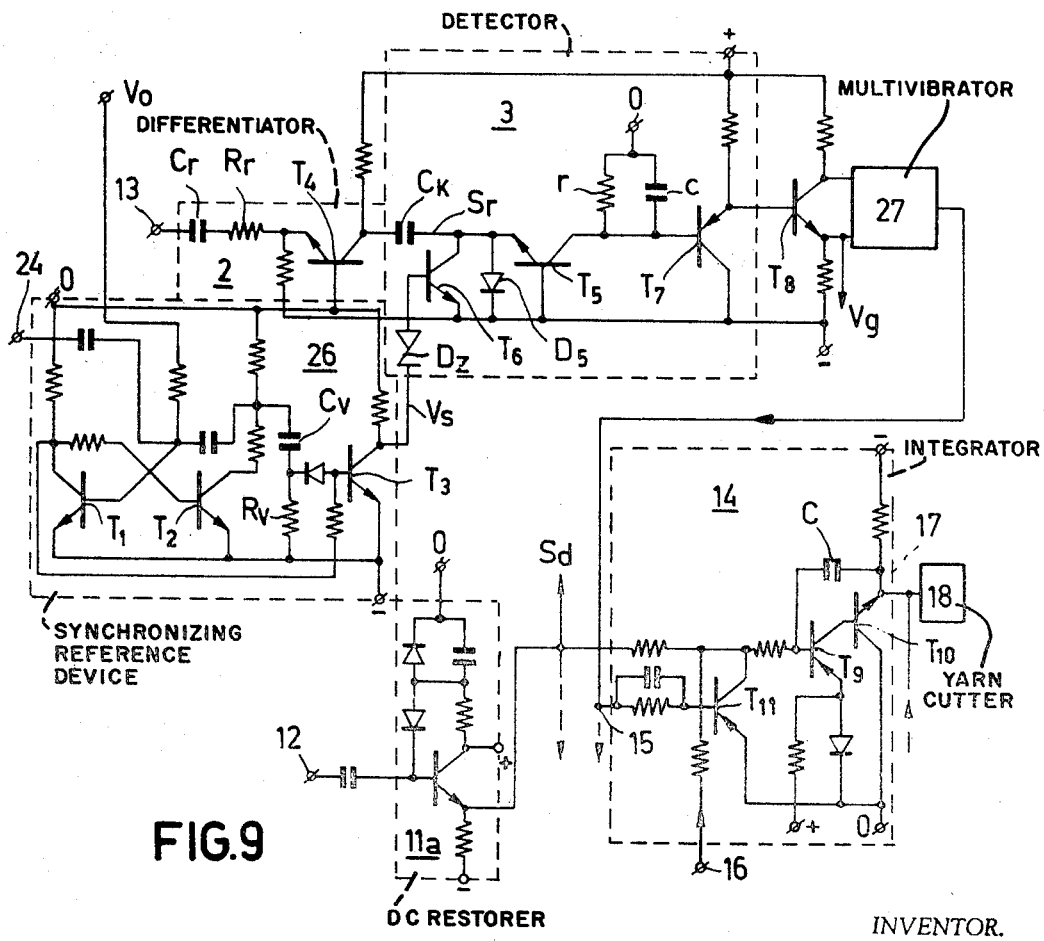
FIG. 9 is a circuit diagram of part of the device of FIG. 7.

FIG. 9 shows diagrammatically a few details of the device of FIG. 7. The blocks outlined by broken lines represent the parts 11a, 26, 2, 3 and 14 of FIG. 7.

The synchronizing reference adjusting circuit 26 comprises a multivibrator circuit including transistors $T_1$ and $T_2$. The instant of changeover is determined by the front flank $T_0$ (see FIG. 8) of a pulse coming in across the conductor 24 of the supply source 23 (FIG. 7). The length of a pulse produced in the multivibrator comprising the transistors $T_1$ and $T_2$ depends upon the speed reference voltage applied to the terminal $V_0$. The pulse appearing at the output of the transistor $T_3$ of the device 26, which pulse is slightly delayed across an RC-combination $R_v$, $C_v$ in order to be beyond the end of the front flank of the supply pulses, is the pulse required for controlling the rectifier, which pulse is synchronized and standardized.

The yarn signal across the conductor 13 is applied to a differentiator 2, here a simple series combination of a capacitor $C_r$ and a resistor $R_r$ together with the input resistance of the transistor $T_4$. The differentiated signal, i.e. the yarn noise signal $S_r$, is applied through a coupling capacitor $C_k$ to the amplitude detector 3 (rectifier). The detector is controlled via a short-circuiting transistor $T_6$ from the device 26 via a Zener diode $D_z$ by the pulse voltage appearing at the collector of the transistor $T_3$. After smoothing in filter components $r$ and $c$ and amplification in a transistor $T_7$, the speed signal $V_a$ is applied via a symmetrical output stage comprising a transistor $T_8$ to the multivibrator 27.

The repetition frequency of the pulses produced in the multivibrator depends upon the speed signal $V_a$, which may be recorded as a measure of the yarn speed. These pulses control the integrator 14.

Via a conductor 12 the yarn diameter signal $S_d$ is applied to the integrator 14, subsequent to DC-restoring in the device 11a. The integrator is formed by a capacitor C which is connected as a so-called Miller capacitor to the two transistors $T_9$ and $T_{10}$. The capacitor C is charged by the yarn diameter signal $S_d$ in a rhythm determined by the pulses applied by the multivibrator 27 to the input 15 of the integrator and by the threshold current supplied to the terminal 16. These pulses control a transistor $T_{11}$ so that the charging time of the capacitor C is determined by the on-out ratio of the pulses, i.e. by the yarn speed from the multivibrator 27. When a given voltage is attained across C, a pulse appears at the output 17 which controls said error counting and/or yarn cutting device.

It should be noted that each yarn cleaner may comprise various controllable integrators 14 with different threshold voltages or threshold currents for sorting out different kinds of errors, for example, short and long slubs, double yarns and the like. The cutting device 18 may be used for all integrator outputs 17 of a yarn cleaner.

What I claim is:

1. A yarn testing device comprising a pickup member in which an electrical signal is derived from a passing yarn, said signal having a yarn noise signal component produced by the natural irregularities of the yarn and whose amplitude and frequency are proportional to the speed of travel of the yarn, a network coupled to the output of the pickup member for passing the higher frequencies of the yarn signal whereby the yarn noise signal alone is derived at its output, a voltage proportional to a reference yarn speed, and means coupled to the network output for detecting the amplitude or the frequency of said yarn noise signal and for comparing it to the reference voltage to derive a signal proportional to the yarn speed.

2. A device as claimed in claim 1 wherein the network passing the higher frequencies of the yarn signal includes a signal differentiator.

3. A device as claimed in claim 2 further comprising means for measuring a length of the yarn comprising, means connecting the output of the means for detecting the amplitude of the yarn noise signal to an integrator, and means connecting the integrator to a start-stop device controlling the integrator and indicating the beginning and the end of the length of yarn to be measured.

4. A device as claimed in claim 1 further comprising means for measuring a length of yarn comprising, means connecting the yarn noise signal at the output of the network passing the higher frequencies of the yarn signal to a frequency detector followed in cascade by a counting pulse producing device and a counter, said counter being controlled by a start-stop device indicating the beginning and the end of the length of yarn to be measured.

5. A device as claimed in claim 1 further comprising, an integrator having an automatically adjustable integration time constant, means for applying the yarn signal from the pickup member to an input of the integrator, and means for coupling the yarn speed control signal produced by said detecting means to an input of the integrator so as to vary the integration time constant of the integrator.

6. A device as claimed in claim 5 in which the pickup member is energized by a source of alternating voltage, and further comprising a device synchronized with the alternating supply voltage and having an output for controlling the operation of the amplitude or frequency detector.

7. A device as claimed in claim 6 characterized in that the device synchronized by the alternating supply voltage is adjustable by means of a reference speed signal applied to an input thereof.

8. A device as claimed in claim 7 wherein the device synchronized with the alternating supply voltage includes a multivibrator controlled by the supply voltage and the reference speed signal so that its pulse frequency is determined by the frequency of the alternating supply voltage and the pulse duration is determined by the reference speed signal.

9. A yarn testing device comprising a pickup member in the path of the yarn for deriving an electric yarn signal that is substantially independent of any physical contact of the moving yarn with a part of the pickup member, said yarn signal including a high frequency yarn noise component that is proportional to yarn speed and which is produced by normal irregularities of the yarn, a high pass network coupled to the output of the pickup member for passing the yarn noise signal component to an output of the network, a source of reference speed signal, and means coupled to the network output and to the reference speed signal source for detecting the yarn noise signal and comparing it with the reference speed signal to derive a yarn speed-control signal that varies with the speed of travel of the yarn.

10. A device as claimed in claim 9 wherein said high pass network includes signal differentiating means.

11. A device as claimed in claim 9 wherein said detecting means comprises, in cascade, an amplitude detector coupled to the network output and an integrator, and Flip-Flop means having an input coupled to the network output and an output coupled to an input of the integrator, and wherein a reference signal related to a desired yarn length is coupled to said integrator in place of the reference speed signal whereby the integrator produces an output signal that is a measure of said yarn length.

12. A device as claimed in claim 9 further comprising signal integrating means having an electrically adjustable integration time constant, means for coupling the yarn signal from the pickup member to an input of the integrating means, and means for coupling the yarn speed-control signal to an input of the integrating means so as to vary the integration time constant as a function of yarn speed, said integrating means producing an output signal that indicates undesired defects in the yarn and independently of the yarn speed.

13. A device as claimed in claim 12 wherein said integrating means includes a resistor and a capacitor, and means for applying a given threshold current to said capacitor.

14. A device as claimed in claim 12 further comprising, a source of pulsatory voltage energizing said pickup member, and means synchronized with the pulsatory voltage source for supplying a gate control signal to an input of the yarn noise signal detecting means to selectively block the passage of given portions of the yarn noise signal.

15. A device as claimed in claim 14 wherein said gate signal supplying means comprises a multivibrator jointly controlled by the pulsatory voltage and the reference speed signal so that the multivibrator pulse frequency is determined by the pulsatory voltage and the pulse width is determined by the reference speed signal.

16. A device as claimed in claim 15 further comprising a multivibrator interconnected between the output of said detecting means and the input of the integrating means that is used to vary the integration time constant, the pulsatory signal supplied by the multivibrator being variable with the yarn speed.